United States Patent [19]
Harb

[11] 4,072,072
[45] Feb. 7, 1978

[54] DUAL TIRE CUTTING MACHINE

[76] Inventor: Mitchell A. Harb, P.O. Box 261, Lexington, N.C. 27292

[21] Appl. No.: 777,838

[22] Filed: Mar. 15, 1977

[51] Int. Cl.$^2$ .......................... B23B 3/04; B23B 3/06; B23B 37/00

[52] U.S. Cl. .......................................... 82/86; 82/49; 82/54; 82/56; 82/58; 82/60; 82/71; 82/91; 82/101

[58] Field of Search ................... 82/46, 49, 54, 57, 58, 82/60, 70, 71, 70.1, 70.2, 83, 86, 91, 92, 101

[56] References Cited

U.S. PATENT DOCUMENTS

| | | | |
|---|---|---|---|
| 1,891,789 | 12/1932 | Wheeler | 82/49 |
| 3,701,296 | 10/1972 | Snow | 82/83 |
| 3,985,051 | 10/1976 | Brown | 82/101 |
| 3,993,115 | 11/1976 | Greene | 82/49 |
| 4,012,973 | 3/1977 | Tupper | 82/86 |

*Primary Examiner*—Harrison L. Hinson
*Attorney, Agent, or Firm*—J. Gibson Semmes

[57] ABSTRACT

A device is provided which permits the simultaneous cutting or bisecting of a plurality of tires. Large, vertically mounted, circumferentially slotted wheels each adapted to receive a circular cutting blade in each slot, receive the tires. The cutting blades are mounted overhead on a shaft which traverses a pivotally mounted beam which is raised and lowered by a piston. A brake is provided for engaging the tread of the tire, and tensioning means engages the lower rim of the tire to exert a downward pressure when the overhead beam is lowered. Turning power is provided to the cutting blades by means of belts or chains which connect a motive source with the shaft on which the blades are mounted. Collars on either side of the cutting blades engage the tire tread when the blades are lowered to turn the tire. A plurality of slots and corresponding cutting blades can be provided for each wheel with spacers to determine the width of sections cut from the tire. The wheels themselves are slightly tapered at their surface and the slots widen outward toward the center of the wheel to avoid binding.

11 Claims, 10 Drawing Figures

DUAL TIRE CUTTING MACHINE

STATEMENT OF THE INVENTION

The present invention is directed to a device of improved efficiency and versatility for bisecting or cutting tires into strips. More particular the present invention is directed to a device which permits simultaneous bisecting or cutting into strips of a plurality of tires and which is at the same time light weight and economical to employ and possesses various advantages in operation which will be described below.

BACKGROUND OF THE INVENTION

With increasing concern for the environment and the need for environmentally acceptable ways of disposing of waste material, it has become increasingly important to develop devices which specifically facilitate the handling and disposing of waste items which, because of their composition or structure, are otherwise difficult to dispose of. One of the most difficult items to dispose of effectively in our modern society is the automotive tire. Used tires, because of their rubber composition are largely non-degradable and due to their size and awkward configuration are difficult to store. Even the burning of used tires is an unattractive alternative because of the smoke and unpleasant odor that is produced.

Accordingly there is a need for devices which effectively and efficiently permit used automotive tires either to be cut into pieces which can be more easily handled or into sections which can be used for other purposes. Particularly where it is contemplated that the tires will be disposed of by burying them it is important that these tires be bisected since the semi-enclosed interior of the uncut tires provides a breeding place for insects and rodents; and, additionally, the tires will not satisfactorily compact.

Various devices have been proposed or used in the past for bisecting tires by cutting through the circumferences of the tread surface; however devices employed for this purpose have possessed a number of disadvantages which the present invention seeks to avoid. Specifically, some devices of the prior art which have been commercially available have required the expenditure of considerable amounts of energy by actually lifting the heavy tire upward into engagement with a cutting blade. These devices have also generally only been useful for cutting a single tire at a time, which is both energy and man power inefficient. A further disadvantage of previously employed devices has been that the cutting blades have been relatively inaccessible and therefore difficult to either sharpen or replace. Further, these devices have only been adapted for bisecting the tire into two roughly equal portions and have not been constructed so that they could be easily adapted to cut the tire or tires into a plurality of more than two pieces either to facilitate disposal of the tire pieces or to permit them to be used in other operations such as manufacturing. Finally, because of the way in which devices of the prior art have been constructed, they have frequently been somewhat hazardous to use and not subject to the complete and instant control of the operator.

Accordingly, it is the object of the present invention to provide the improved tire cutting device which avoids the disadvantages of the prior art and which is safe, lightweight, easy to use, energy efficient and adapted to a number of variations and operations including the cutting of more than one tire at once into a number of strips.

DESCRIPTION OF THE INVENTION

According to the present invention a tire cutting device is provided having two opposingly mounted, large, rotatable circumferentially slotted wheels. Each of these large slotted wheels is adapted to receive an unmounted tire which is bisected or cut into strips. Mounted above each of the circumferential slots in the large slotted wheels on a horozontal shaft are rotating circular knife blades which are adapted to be lowered to cut the tire so that a section of the rotating blade passes into the corresponding slot in the wheel. The raising and lowering of these rotating knife blades is controlled automatically by a vertically mounted piston which engages one end of an overhead beam through which the shaft passes at its forward end and which is pivotly mounted on a second shaft at the rear of the machine. A chain or belt drive provides rotating power to both shafts and to the circular cutting blades. Rotating force is provided to the tires mounted on the large slotted wheels by means of collars disposed at either side of the rotating knife blade which engage the outer tread surface of the tire when the knife blades are lowered into cutting position. Below each of the large slotted wheels is provided a guide means mounted on a pivoted arm which is connected to the overhead beam so that lowering of the overhead arm causes the guide means to be depressed against the bottom inside rim of the tire thereby tensioning it for cutting. Brake means are also provided adjacent the cutting blade and adapted to be quickly released to stop rotation of the tire. The surface of the large slotted wheels are tapered outward from their circumferential center and the slot in each cutting wheel widens inwardly toward the rotating shaft in order to avoid binding of the cutting blade. Both the circular cutting blades and the large slotted wheels are readily accessible from the side of the machine and can be replaced or removed by the simple removal of a large fastening device. In one embodiment of the present invention cutting wheels are provided having a plurality of parallel slots and corresponding cutting blades with a spacing element disposed between the slots so that strips of desired width can easily cut from the tire.

Other features and advantages of the present invention will however, become more evident as the invention is considered in greater detail with respect to the drawings.

DETAILED DESCRIPTION OF THE DRAWINGS

Figure 1:
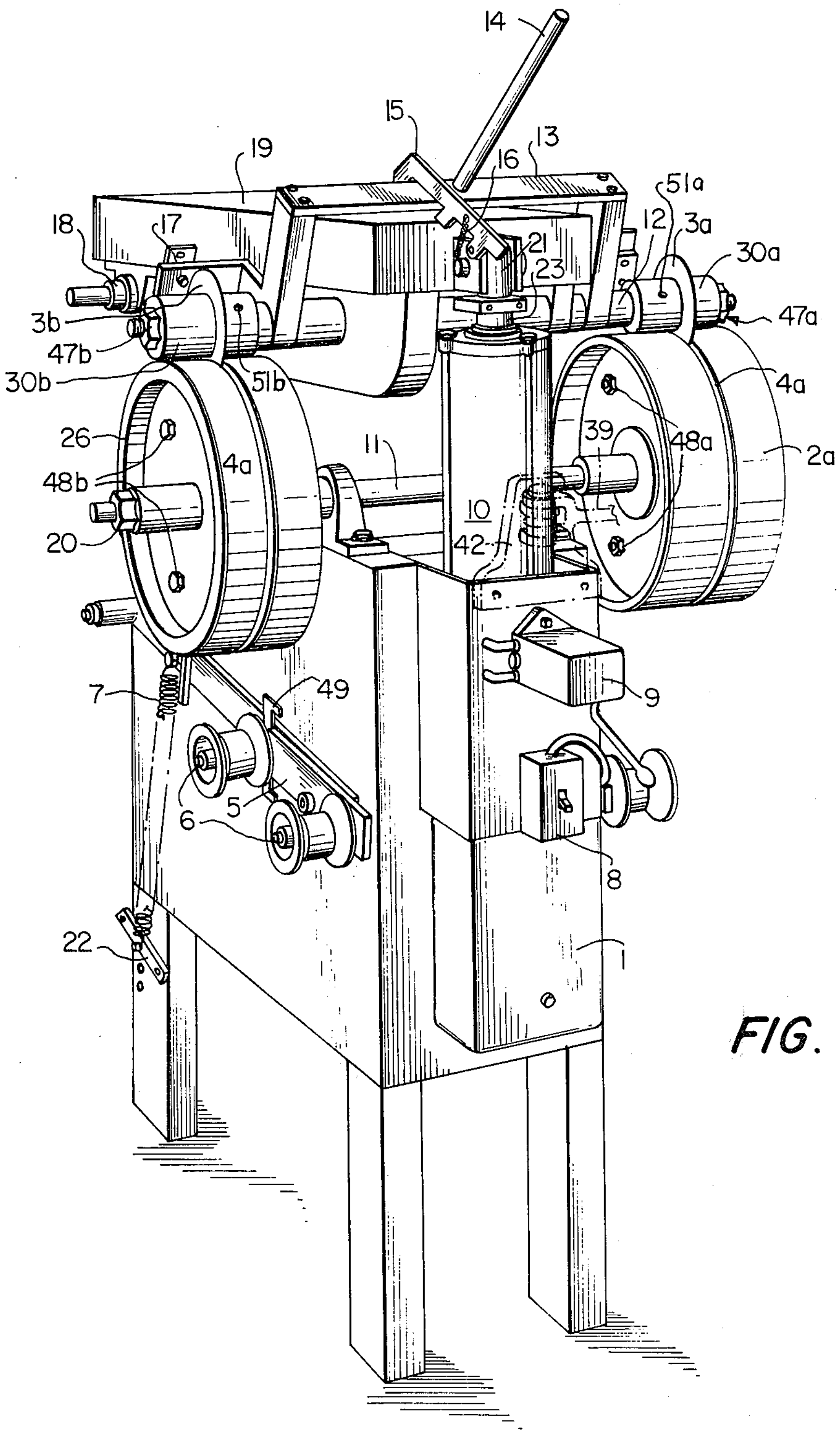
FIG. 1 is a perspective view of the entire device of the present invention absent tires showing the cutting blades lowered into the large slotted wheels of the device.

Directing attention to FIG. 1 of the drawings it will be seen that a four-legged frame 1 is provided upon which a horizontal shaft 11 is mounted with large slotted wheels *2a* and *2b* disposed at either end of the horizontal shaft 11. Each of the large wheels mounted on the shaft comprises two discs which are bolted together by bolts 48A and 48B and is provided with a circumferential groove *4a* and *4b* respectively between the two discs. At the forward end of the frame 1 there is also vertically mounted a cylinder 10 which causes a piston 23 attached at 21 to the overhead beam 19 to either rise vertically or be withdrawn back into the cylinder. Conveniently the cylinder and piston can nbe pneumatically activated by a source of compressed air (not shown) and controlled by switch 9.

An additional horizontal shaft 18 is disposed at the upper rear of the frame 1 to provide a pivot point for the overhead beam 19. Passing through the overhead beam 19 at right angles is a horizontal shaft 12 which circular cutting blades *3a* and *3b* disposed at either end thereof. On either side of each circular cutting blade are disposed drive collars *30a* and *30b* respectively which are maintained in a set position on the shaft by set screws *51a* and *51b*. Large nuts *47a* and *47b* are provided at either end of the shaft 12 to position also the respective drive collars and cutting blades. In order to prevent these nuts from spinning off during operation; the ends of shaft 12 and nuts *47a* and *47b* have threads which cause the nuts to be tightened as the shaft rotates. Thus, nut *47b* has a left hand thread while *47a* has a right hand thread. Also mounted on the horizontal shaft 12 is a "U" shaped bracket 13 having an upward projecting handle 14. Attached to either end of this "U" shaped bracket is an "L" shape projection 17 with terminates in a vertical brake 17 adapted to engage the thread surface of a tire mounted on either of the wheels *2a* or *2b*. A horizontal hinged latch 15 is pivotally mounted at one end of the horizontal member 19 and biased downward by the spring 16 so that it engages the top of the "U" shape member 13 to prevent the rotation thereof on the shaft 12. These details of this latch arrangement when in engagement with the "U" shaped 13 can also be clearly seen in FIGS. 2 and 3. In FIG. 4 of the drawings the latch 15 is shown when it is free of engagement with the member 13 and the brake 17 is engaging the thread surface of a mounted tire 26. to the overhead beam 19 to either rise vertically or be withdrawn back into the cylinder. Conveniently the cylinder and piston can be pneumatically activated by a source of compressed air (not shown) and controlled by switch 9.

An additional horizontal shaft 18 is disposed at the upper rear of the frame 1 to provide a pivot point for the overhead beam 19. Passing through the overhead beam 19 at right angles is a horizontal shaft 12 with circular cutting blades *3a* and *3b* disposed at either end thereof. On either side of each circular cutting blade are disposed drive collars *30a* and *30b* respectively which are maintained in a set position on the shaft by set screws *51a* and *51b*. Large nuts *47a* and *47b* are provided at either end of the shaft 12 to position also the respective drive collars and cutting blades. In order to prevent these nuts from spinning off during operation; the ends of shaft 12 and the nuts *47a* and *47b* have threads which cause the nuts to be tightened as the shaft rotates. Thus, nut *47b* has a left hand thread while *47a* has a right hand thread. Also mounted on the horizontal shaft 12 is a "U" shaped bracket 13 having an upward projecting handle 14. Attached to either end of this "U" shaped bracket is an "L" shape projection 17 with terminates in a vertical brake 17 adapted to engage the thread surface of a tire mounted on either of the wheels *2a* or *2b*. A horizontal hinged latch 15 is pivotally mounted at one end of the horizontal member 19 and biased downward by the spring 16 so that it engages the top of the "U" shape member 13 to prevent the rotation thereof on the shaft 12. These details of this latch arrangement when in engagement with the "U" shaped 13 can also be clearly seen in FIGS. 2 and 3. In FIG. 4 of the drawings the latch 15 is shown when it is free of engagement with the member 13 and the brake 17 is engaging the thread surface of a mounted tire 26.

Figure 3:
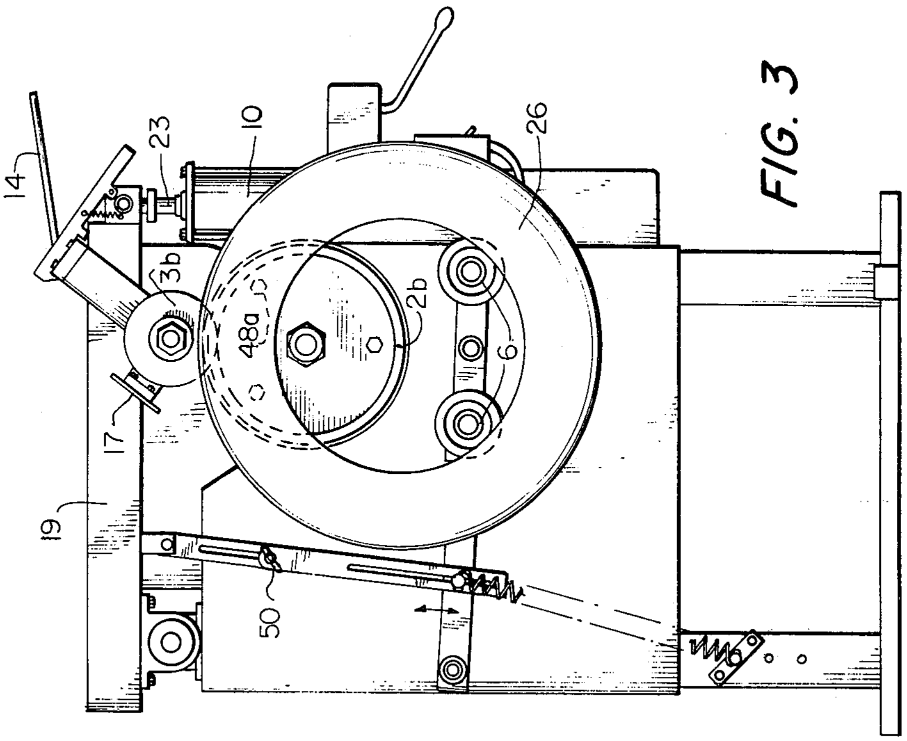
FIG. 3 is a left side view of the device of the present invention showing the overhead arm and cutting blade in a lowered position with a tire mounted on the large slotted wheel and guide rollers engaging the bottom inside bead of the tire to provide proper tension.
Figure 2:
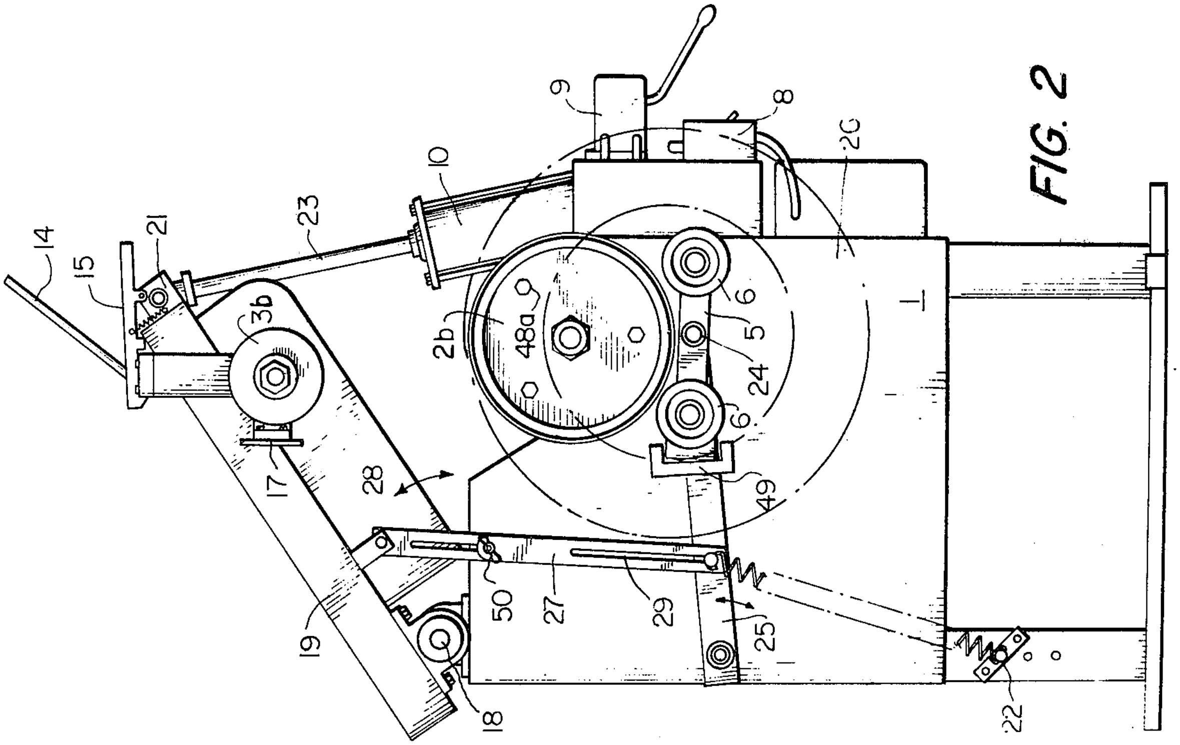
FIG. 2 is a side view of the device of the present invention showing the overhead arm and cutting blade in a raised position with a mounted tire shown in phantom on the large slotted wheel.
Figure 4:
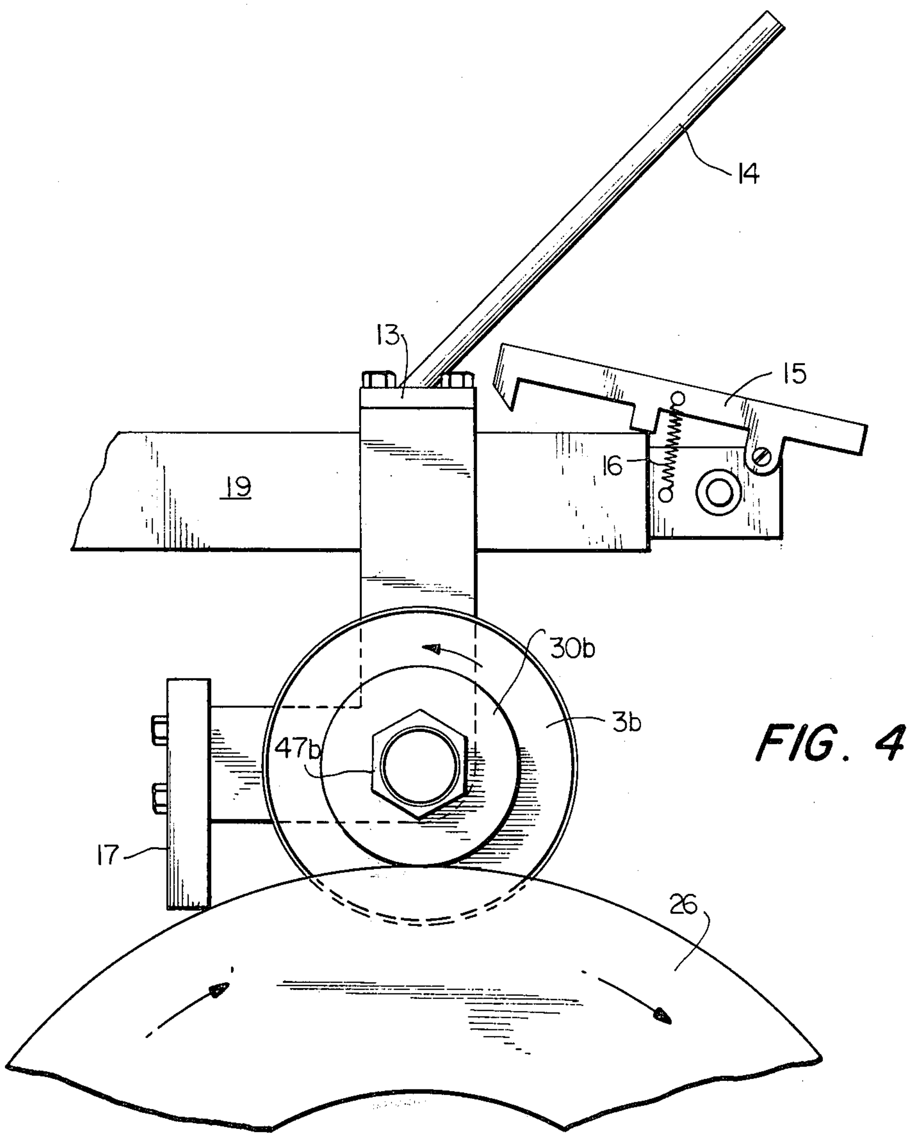
FIG. 4 is a detailed close-up view of the cutting and the brake mechanism of the present invention.

Directing attention particularly to FIG. 2 and 3 of the drawing it will be seen that a pair of guide rollers 6 are pivotally mounted on a generally horizontal member 5 on either side of the frame 1 (the right hand guide members are not shown in the drawings). The horizontal member 25 is adjustably attached by slotted vertical member 27 to the horizontal member 19 and pivotally attached at 24 to the member 5. Downward tension is maintained on the horizontal members 25 and 5 and the guide rollers 6 by means of a spring 7 which attaches at one end to the horizontal member 25 and at the end to bracket 22 which is mounted in a vertically adjustable manner on either the frame or a leg of the frame as shown in the drawing to permit to permit varying the tension on spring 7. As shown for example, in FIG. 3 of the drawing when the overhead beam 19 is depressed to a horizontal position by means of the piston 23 so that the cutting blade is engaging the surface of a tire and disposed within the slot 4 for the wheel 2, the guide rollers engage the lower inner rim of the tire 26 with tension applied by the spring 22 in order to facilitate a cutting of the tire. An adjustable bracket, 49, is mounted on the member 25 so as to engage and restrain excessive vertical movement of member 5. The position of the guide rollers 6 can be adjusted to accommodate different size tires by simply loosening the wing nut 50 and lengthening or shortening the slotted vertical member 27. Also as clearly seen for example in FIG. 4 when the cutting blade *3b* is actually engaging the tread of the tire and cutting it the collar *30b* engages the tire surface at either side of the cut which is being made and exerts a downward and outward pressure which spreads out the tire surface while inparting a rotation to the tire which is counter to that of the cutting blade. Thus, the tire is simultaneously rotated, cut and separated in such a way that binding of the cutting blades is prevented.

Control of the device of the present invention, is maintained by means of a switch 8 which controls the electrical circuitry of the device and is mounted at a convenient location on the frame and an additional control 9 which activates the cylinder 10 and the piston 23. Advantageously this cylinder can be pneumatically operated although other means could be employed such as hydraulic or mechanical gear arrangements.

Figure 5:
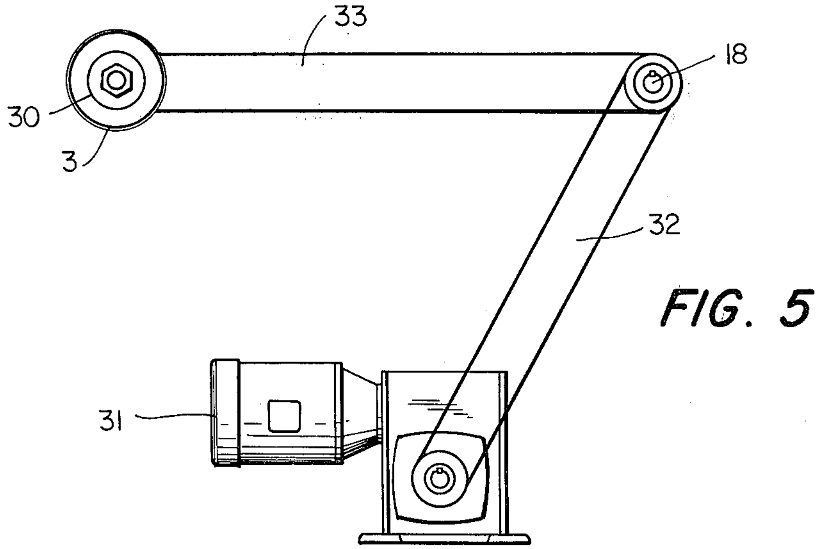
FIG. 5 is a diagramatic side view of the power train which drives the respective cutting blades.
Figure 6:
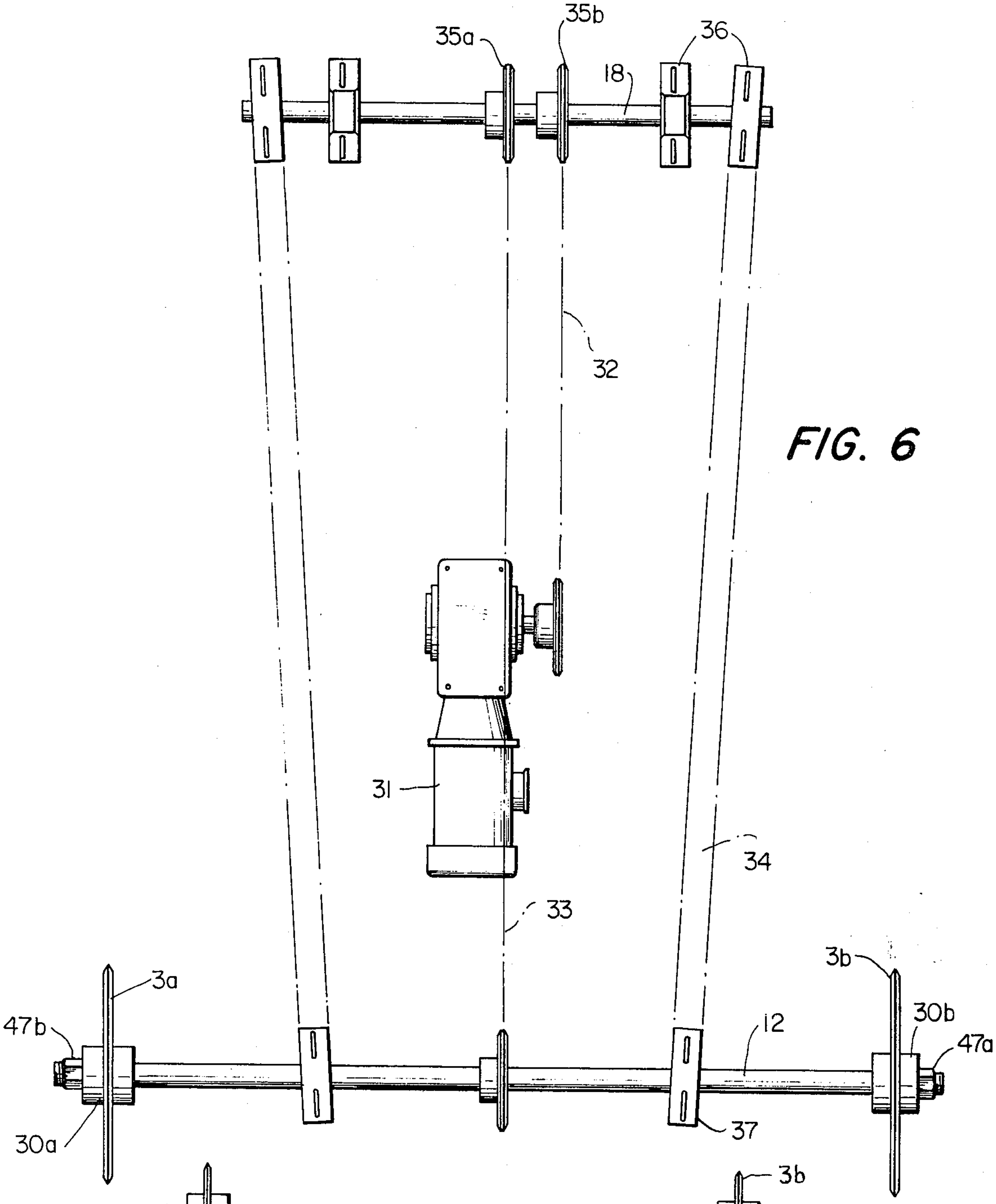
FIG. 6 is an overhead diagramatic view of the power train which drives the respective cutting blade.

Directing attention specifically to FIGS. 5 and 6 of the drawings it will be seen that suitable motive power is provided by a motor and gear means 31 for driving the cutting blades and drive collars. The motor and gear means 31 are connected by a suitable belt or chain to a drive sprocket 35*b* mounted on the shaft 18 disposed at the upper rear of the frame 1 (not shown in FIGS. 5 and 6). The shaft 18 is supported at either end by support bearings 36. A second drive sprocket 35*a* is provided for driving an additional chain or belt 33 which connects with a drive sprocket mounted on the shaft 12 which is supported at the forward end of the frame by the support bearings 37. As heretofor noted, the shaft 18 at the rear of the frame, in addition to providing a mount for the drive sprocket 35*a* and b, also provides the pivot for the overhead beam 19 which carries the horizontal forward shaft 12 upon which the respective cutting blades are mounted.

Figure 8:
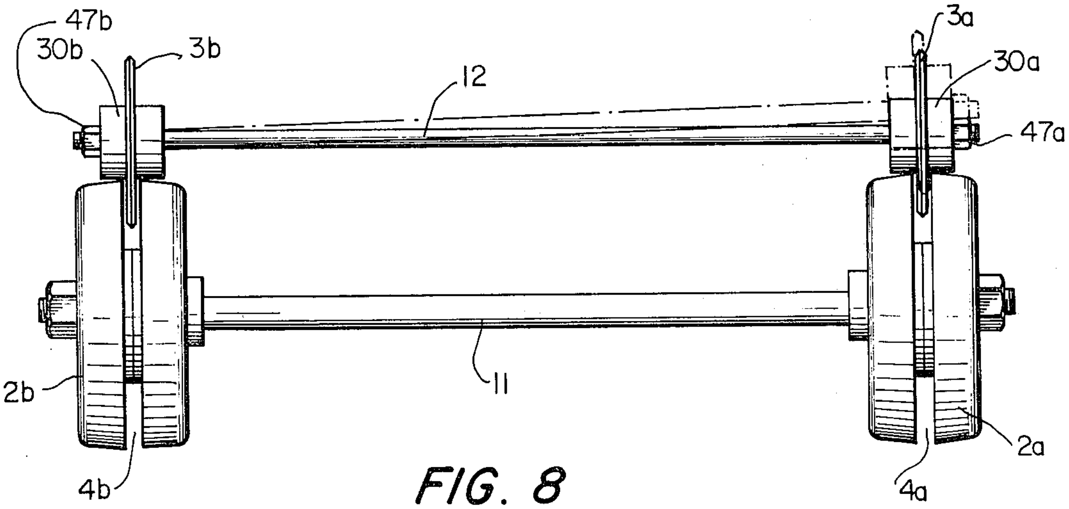
FIG. 8 is a front view showing in detail the circular cutting blades entering the tapered slotted sheels.
Figure 9:
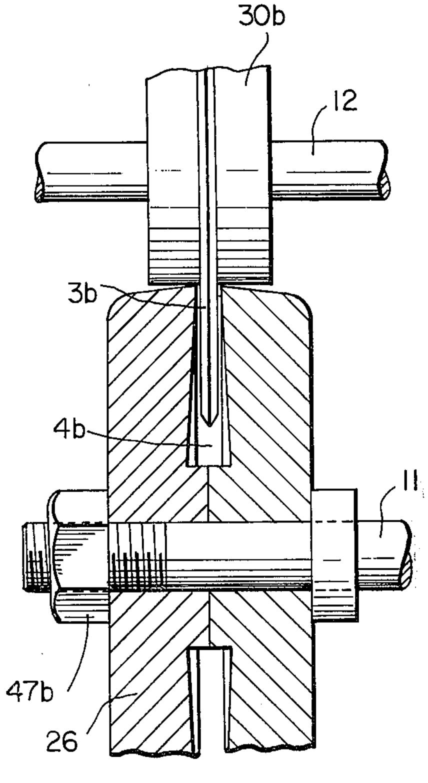
FIG. 9 shows in greater detail the slotted wheel with the cutting blade disposed therein.

Directing attention to FIG. 8 of the drawing it will be seen that the large slotted wheels 2*a* and 2*b* are beveled from their center outward so the outer diameter on either side of the wheel is slightly smaller than at the center portion of the circumference of the wheel. Additionally, as particularly shown in FIG. 9 and 10 of the drawings, the slots 4B, 4B′ and 4B″ themselves do not have parallel vertical sides but taper outward toward the center of the respective wheel. This feature of the present invention is particularly important in order to prevent binding of the wheel during cutting and to permit sufficient clearance for the cutting blade.

Figure 10:
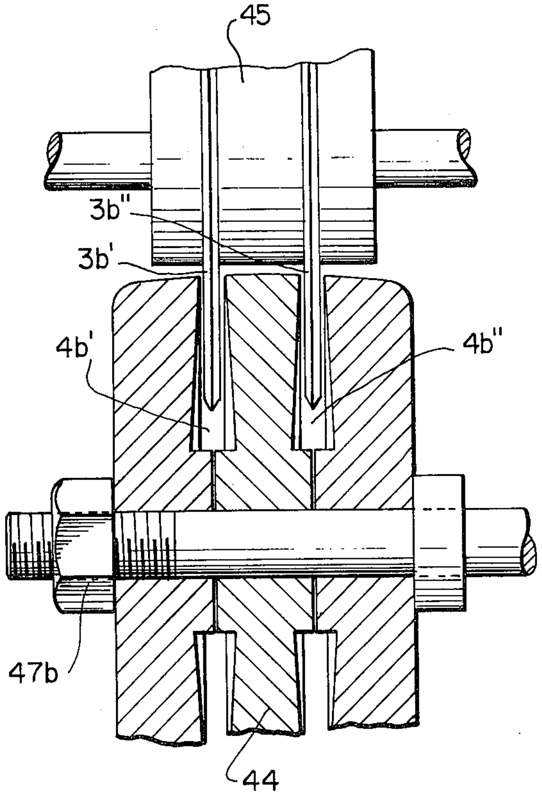
FIG. 10 shows the embodiment of the present invention wherein a slotted wheel is employed having parallel spaced slots which accomodate corresponding cutting blades.

Attachment of the slotted wheels and the cutting blade to their respective shaft is accomplished by the simple expedient of providing a nut of relatively large size at the end of the shafts 11 and 12, respectively. As shown in FIG. 10 it is an additional feature of the present invention that large wheels or arbors can be employed according to this invention which are provided with a plurality of slots 4B′ and 4B″ separated by a removable spacing element 44. Of course, when slotted wheels are employed using a plurality of such slots, plural cutting blades 3B′ and 3B″ are also used which correspond in position to the slots in the wheel. Advantageously, removable spacers 44 and 45 respectively are provided between the slots and blades so that the distance between the cuts made in the tire can easily be varied. In this manner it is possible with the present invention to cut a given tire into any number of strips or to cut strips of a particular desired width which may find application in other fabrications such as making of soles for shoes or sandals.

Figure 7:
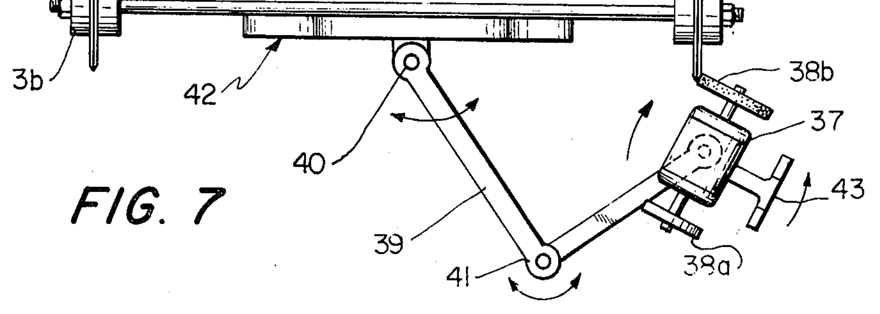
FIG. 7 shows the pivoted cutting blade sharpening device in relationship to the circular cutting blade.

FIG. 7 of the drawing shows a pivoted sharpening attachment which is advantageously attached to the forward section of the device of the present invention with a bracket 42. This sharpening device has rotating sharpening wheels 38*a* and 38*b* and a handle 43. It is pivotally attached at 41 to an arm 39 which in turn is pivotally mounted at 40 in the bracket 42 which actually attaches at a convenient location on the front of the device as shown in phantom in FIG. 1. Thus, when the blades become dull, as they frequently do in ordinary operation, the cutting device can be manipulated on either side to quickly and efficiently sharpen the circular cutting blades without the necessity of removing them from the device.

It is also within the contemplation of the present invention that slotted wheels of different diameters and widths can readily and quickly employed depending upon the size of the tire to be cut. In this manner, it is possible to easily adapt the device of the present invention to cut any size tire from the very smallest automotive tire to large truck and other commercial vehicle tires without having to disassemble a portion of the machine to do so.

Other features and modifications of the present invention will be apparent to those skilled in the art and are encompassed within the scope of the invention described herein.

I claim:

1. A machine for cutting tires into a plurality of pieces which comprises:

A. a frame;

B. a pair of wheels, vertically positioned upon the frame for receiving said tires, said wheels being opposingly positioned relative to each other and circumferentially slotted for the coactive positioning therein of circular cutting blades;

C. circular cutting blades mounted upon a first horizontal shaft, said first horizontal shaft being disposed transversely of the frame and secured to one end of a horizontal overhead beam;

D. an overhead beam, pivotally mounted on a second horizontal shaft which said second shaft is secured to the frame, said overhead beam being further pivotally connected with means, vertically mounted upon the frame for raising and lowering the end of said overhead beam so that said cutting blades may engage the circumferential slots in the cutting wheels when said overhead beam is lowered and raised;

E. horizontal tensioning bar means, pivotally mounted upon the frame at one end and connected with said overhead beam to engage the lower inside bead of a tire with a downward tensioning pressure when said overhead beam is lowered;

F. collar means adjacent either side of each said cutting blade, said collar means being of smaller diameter than said cutting blades for engaging the tread surfaces of said tires when the overhead beam is in the lower position to impart a turning motion thereto; and G. power means connected to said first horizontal shaft for turning said shaft, collars and cutting blades.

2. The device of claim 1 wherein said means for raising and lowering the overhead beam is a pneumatic piston.

3. The device of claim 1 wherein brake means are rotationally mounted on said first horizontal shaft for engaging the tread surface of a mounted tire to resist turning of said tire.

4. The device of claim 1 wherein said horizontal tensioning bar is vertically adjustable through its connection with said overhead beam and includes roller guides for engaging the lower inside bead of a mounted tire.

5. The device of claim 1 in which the circumferential surface of said wheel means are tapered outward so that the outside diameter of said wheels is slightly smaller than the diameter at the center of the surface.

6. The device of claim 1 in which the slots in said wheel means are tapered to a greater width from the circumference to the axis of the wheel.

7. The device of claim 1 which further includes means for sharpening said cutting blades pivotally mounted on said device so as to reach the cutting surfaces of the respective blades.

8. The device of claim 1 wherein a plurality of slots and corresponding cutting blades is provided for each wheel means with removable spacers provided between each pair of such blades and slots.

9. The device of claim 1 in which said power means comprises a source of rotational energy connected to turn said second horizontal shaft which in turn is connected to said first horizontal shaft with means for transmitting said rotational energy to said second shaft and circular cutting blades.

10. The device of claim 1 in which said wheel means consist of mated right and left hand discs which are joined together on a common axis.

11. The device of claim 1 which is adapted to rotate said tires in a downward direction toward the operator of the device to avoid danger thereto.

* * * * *